United States Patent
Xing et al.

(10) Patent No.: US 10,982,145 B2
(45) Date of Patent: *Apr. 20, 2021

(54) NEGATIVE DIELECTRIC ANISOTROPIC LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., Ltd., Hebei (CN)

(72) Inventors: Wenxiao Xing, Hebei (CN); Jiaming Li, Hebei (CN); Ruixiang Liang, Hebei (CN); Xuanfei Sun, Hebei (CN); Yapeng Huang, Hebei (CN); Hongru Gao, Hebei (CN)

(73) Assignee: SHIJIAZHUANG CHENGSHI YONGHUA DISPLAY MATERIAL CO., LTD., Hebei (CN)

( * ) Notice: Subject to any disclaimer, the term of this patent is extended or adjusted under 35 U.S.C. 154(b) by 54 days.

This patent is subject to a terminal disclaimer.

(21) Appl. No.: 16/427,829

(22) Filed: May 31, 2019

(65) Prior Publication Data

US 2019/0375986 A1 Dec. 12, 2019

(30) Foreign Application Priority Data

Jun. 11, 2018 (CN) .......................... 201810597190.8

(51) Int. Cl.
*G02F 1/1333* (2006.01)
*C09K 19/30* (2006.01)
*C09K 19/12* (2006.01)
*C09K 19/06* (2006.01)
*G02F 1/137* (2006.01)

(52) U.S. Cl.
CPC ........ *C09K 19/3003* (2013.01); *C09K 19/066* (2013.01); *C09K 19/068* (2013.01); *C09K 19/12* (2013.01); *C09K 19/3066* (2013.01); *C09K 19/3098* (2013.01); *G02F 1/137* (2013.01); *C09K 2019/123* (2013.01); *C09K 2019/301* (2013.01); *C09K 2019/3016* (2013.01); *C09K 2019/3018* (2013.01); *G02F 2001/13712* (2013.01)

(58) Field of Classification Search
CPC .............. C09K 19/3003; C09K 19/066; C09K 19/068; C09K 19/12; C09K 19/3066; C09K 19/3098; C09K 2019/123; C09K 2019/301; C09K 2019/3016; C09K 2019/3018; G02F 1/1333; G02F 1/137; G02F 2001/13712
USPC ..................................... 252/299.63
See application file for complete search history.

(56) References Cited

U.S. PATENT DOCUMENTS

| | | | |
|---|---|---|---|
| 9,745,513 B2 * | 8/2017 | Kuriyama | C09K 19/542 |
| 2019/0375986 A1 * | 12/2019 | Xing | C09K 19/3066 |
| 2020/0239779 A1 * | 7/2020 | Kang | C09K 19/3098 |

* cited by examiner

*Primary Examiner* — Geraldina Visconti
(74) *Attorney, Agent, or Firm* — Muncy, Geissler, Olds & Lowe, P.C.

(57) ABSTRACT

The present invention relates to a negative dielectric anisotropic liquid crystal composition, a liquid crystal display element, and a liquid crystal display. The negative dielectric anisotropic liquid crystal composition of the present invention comprises a first component composed of one or more compounds represented by formula I and a second component composed of one or more polymerizable compounds: The negative dielectric anisotropic liquid crystal composition disclosed by the present invention has a low rotary viscosity, a fast response speed and a good stability, and is very suitable for manufacturing liquid crystal display elements, particularly suitable for PS (polymer-stabilized) or PSA (polymer-stabilized alignment)-type liquid crystal displays.

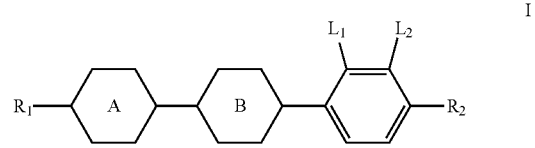

14 Claims, No Drawings

NEGATIVE DIELECTRIC ANISOTROPIC LIQUID CRYSTAL COMPOSITION, LIQUID CRYSTAL DISPLAY ELEMENT AND LIQUID CRYSTAL DISPLAY

TECHNICAL FIELD

The present invention relates to the technical field of liquid crystal displays. In particular, the present invention relates to a negative dielectric anisotropic liquid crystal composition, liquid crystal display element and liquid crystal display.

BACKGROUND ART

Thin film transistor liquid crystal displays (TFT-LCDs) have undergone a long period of basic research, and after realising large-scale production and commercialisation, thin film transistor liquid crystal displays have become mainstream products in LCD applications due to the advantages of light weight, being environmentally friendly, high performance, etc., thereof: the application of TFT-LCD can be seen everywhere whether in small-sized mobile phone screens, large-sized notebook PCs or monitors or in large-sized liquid crystal televisions (LCD-TV).

Early commercial TFT-LCD products basically relate to using a TN display mode, and the largest problem thereof is a narrow viewing angle. With the increase in product size, especially in applications in the TV field, an IPS display mode and a VA display mode, which feature a wide view angle, have been sequentially developed and applied; in particular, on the basis of the improvement of the VA display mode, many big companies have successively made a breakthrough in the development thereof, which mainly depends on the advantages of a wide view angle, a high contrast, no need for rubbing alignment, etc., of the VA mode itself furthermore, the contrast of the VA mode display is less dependent on the optical anisotropy ($\Delta n$) of a liquid crystal, the thickness of a liquid crystal cell (d) and the wavelength (X) of an incident light, which will inevitably make the VA mode become a very promising display technique.

Liquid crystal media used for active matrix addressing modes such as a VA mode themselves are not perfect, for example, they have the disadvantages of an afterimage level significantly worse than that of positive dielectric anisotropy display element, a relatively slow response time, a relatively high drive voltage, etc. At this point, some new types of VA display techniques have quietly emerged: for example, a PSVA technique realises a wide viewing angle display mode similar to that of MVA/PVA, and also simplifies a CF process, such that the aperture ratio is increased while lowering the CF cost; furthermore, a higher brightness is obtained, thereby obtaining a higher contrast. In addition, since the liquid crystal of the entire panel has a pre-tilt angle, there is no domino delay phenomenon, a faster response time can also be obtained while maintaining the same drive voltage, and the after image level will also not be affected; however, due to Fine Slit densely distributed electrodes in pixels, if the electrode width cannot be evenly distributed, the problem of uneven display can easily occur. For example, in a UVVA technique, on the basis of keeping the advantages of the PSVA technique, since there is no Slit structure on the TFT side, the problem of display unevenness caused by uneven pixel electrode width is also improved. Although display devices are constantly evolving, it is still necessary to make a constant effort to study new liquid crystal compositions, such that liquid crystal compositions and their properties in the case of application to display devices, especially response speed, as well as improvement of various display defects, continue to move forward.

SUMMARY OF THE INVENTION

An object of the present invention is to provide a negative dielectric anisotropic liquid crystal composition, and a liquid crystal display element or liquid crystal display comprising the liquid crystal composition, intended to solve the problem of negative dielectric anisotropic liquid crystal compositions having a slow response time, the invention achieving a reduction in the rotary viscosity of and an increase in the response speed of the negative dielectric anisotropic liquid crystal composition by means of a first component composed of one or more compounds represented by formula I and a second component composed of one or more polymerizable compounds.

In order to solve the above-mentioned technical problems, a first aspect of the present invention is:

a negative dielectric anisotropic liquid crystal composition comprising a first component composed of one or more compounds represented by formula I and a second component composed of one or more polymerizable compounds:

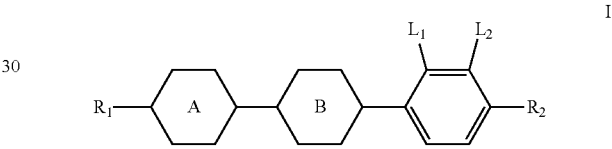

wherein $R_1$ represents an alkyl group having a carbon atom number of 1-10, an alkoxy group having a carbon atom number of 1-10, an alkenyl group having a carbon atom number of 2-10, a fluoro-substituted alkenyl group having a carbon atom number of 2-10, or an alkenoxy group having a carbon atom number of 3-8, wherein any one or more $CH_2$ in $R_1$ may be optionally substituted with cyclopentyl, cyclobutyl or cyclopropyl;

$R_2$ represents $-(CH_2)_p-CH=CH-C_qH_{2q+1}$, with p and q each independently representing 0, 1, 2 or 3;

$L_1$ and $L_2$ each independently represent H, F or Cl; and

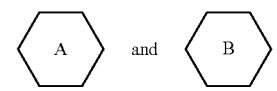

each independently represent

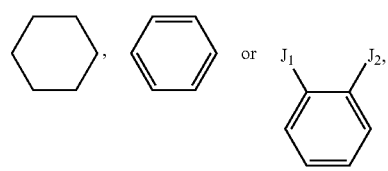

with $J_1$ and $J_2$ each independently representing H, F or Cl.

Examples of the above-mentioned polymerizable compound include, for example, one of or a combination of some of an acrylate, an acrylate derivative, a methacrylate, a methacrylate derivative, styrene, a styrene derivative, and an epoxy resin. The polymerizable compound may be added to the liquid crystal composition alone, or alternatively, a mixture of two or more polymerizable compounds may be used.

Alternatively, in the above-mentioned negative dielectric anisotropic liquid crystal composition, the ratio of the above-mentioned first component to the above-mentioned second component may be such that, for example, the proportion of the above-mentioned first component is 99%-99.9% and the proportion of the above-mentioned second component is 0.1%-1%.

Optionally, the above-mentioned polymerizable compound is a compound represented by formula II:

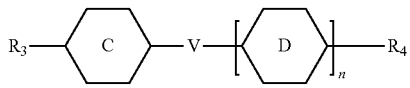

II wherein $R_3$ and $R_4$ each independently represent W-Sp-, H, Cl, F, or an alkyl group having a carbon atom number of 1-12, with one or two non-neighboring $CH_2$ groups in the above-mentioned alkyl group having a carbon atom number of 1-12 being optionally replaced by —O—, —$CH_2$=$CH_2$—, —CO—, —OCO— or —COO—, wherein at least one of $R_3$ and $R_4$ represents W-Sp-;

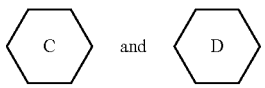

each independently represent a phenylene group, a phenylene group optionally substituted with W-Sp-, Cl, F, an alkyl group having a carbon atom number of 1-12 or an alkoxy group having a carbon atom number of 1-12, or an indanyl group, wherein one or two non-neighboring $CH_2$ groups in said alkyl group having a carbon atom number of 1-12 and said alkoxy group having a carbon atom number of 1-12 are optionally replaced by —O—, —$CH_2$=$CH_2$—, —CO—, —OCO— or —COO—; furthermore,

and $R_3$ are bonded at any position of

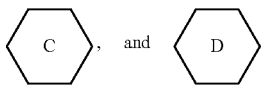

and $R_4$ are bonded at any position of

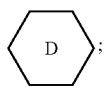

;

n represents 0, 1 or 2;

W represents a methacrylate group or an acrylate group; and

V and Sp each independently represent a single bond, —COO—, —$CH_2$O— or —$CH_2CH_2$—.

Optionally, said compound represented by general formula I is selected from the group consisting of compounds represented by formulas I1-I6:

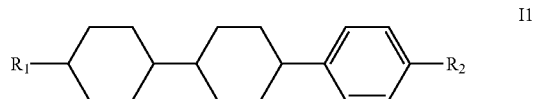

I1

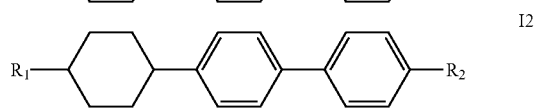

I2

I3

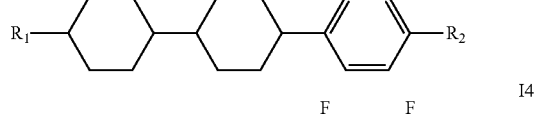

I4

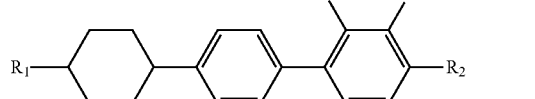

I5

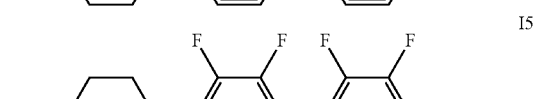

I6 wherein $R_1$ represents an alkyl group having a carbon atom number of 1-10, an alkoxy group having a carbon atom number of 1-10, an alkenyl group having a carbon atom number of 2-10, a fluoro-substituted alkenyl group having a carbon atom number of 2-10, or an alkenoxy group having a carbon atom number of 3-8, wherein any one or more $CH_2$ in $R_1$ may be optionally substituted with cyclopentyl, cyclobutyl or cyclopropyl;

$R_2$ represents —$(CH_2)_p$—CH=CH—$C_qH_{2q+1}$, with p representing 0, 1, 2 or 3 and q representing 0, 1, 2 or 3;

the compound represented by formula II is selected from the group consisting of compounds represented by formulas II1-II4:

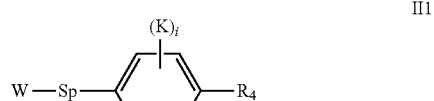

II1

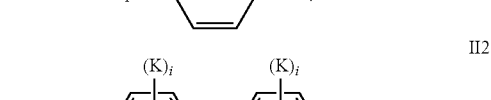

II2

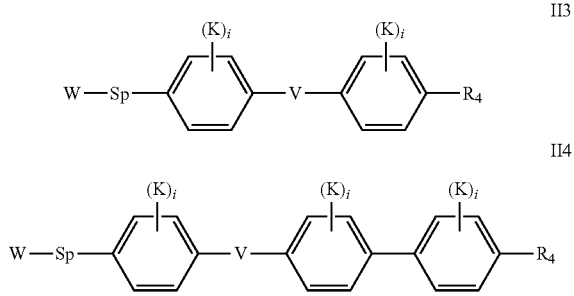
II3

II4 wherein $R_4$ and K each independently represent $W_1$-Sq-, H, Cl, F, or an alkyl group having a carbon atom number of 1-12, wherein one or two non-neighboring $CH_2$ groups in the alkyl group having a carbon atom number of 1-12 is optionally replaced by —O—, —$CH_2$=$CH_2$—, —CO—, —OCO— or —COO—, W and $W_1$ each independently represent a methacrylate group or an acrylate group;

V, Sp, and Sq each independently represent a single bond, —COO—, —$CH_2$O— or —$CH_2CH_2$—; and each I independently represents 0, 1, 2, 3 or 4.

Optionally, the compound represented by formula II is selected from the group consisting of compounds represented by formulas II5-II12:

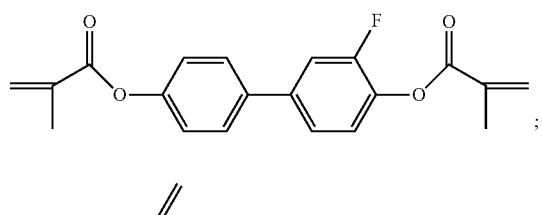
II5

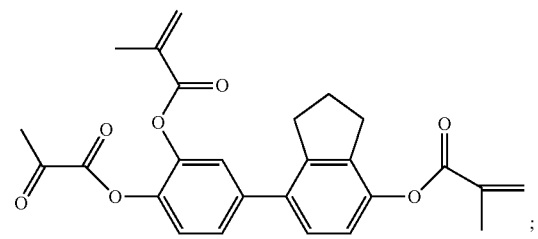
II6

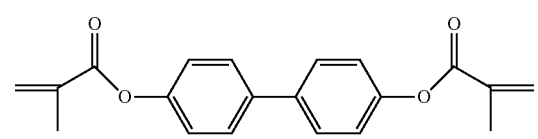
II7

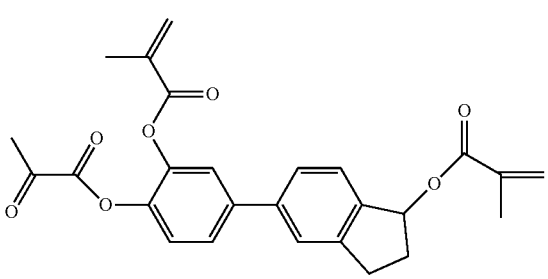
II8

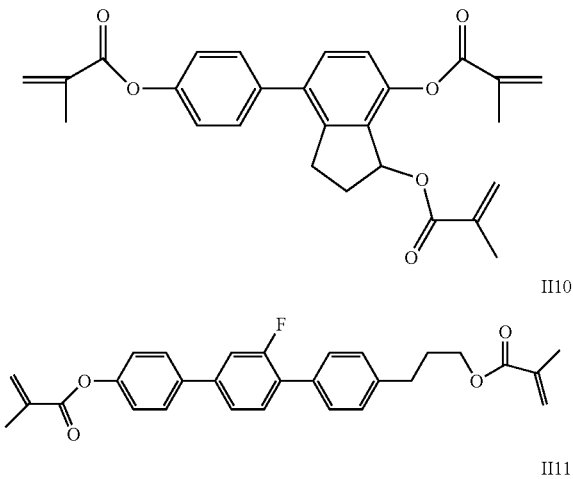
II9

II10

II11

II12

Optionally, the above-mentioned negative dielectric anisotropic liquid crystal composition further comprises one or more compounds represented by formula III:

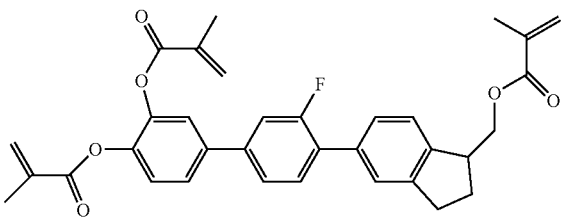
III wherein $R_5$ and $R_6$ each independently represent an alkyl group having a carbon atom number of 1-10 or an alkoxy group having a carbon atom number of 1-10, and any one or more $CH_2$ in $R_5$ and $R_6$ are optionally substituted with cyclopentyl, cyclobutyl or cyclopropyl;

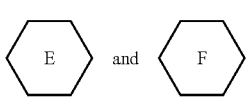

each independently represent

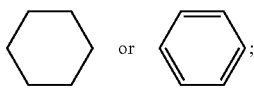 [SMILES: C1CCCCC1 ; c1ccccc1]

and r represents 1 or 2.

Optionally, the above-mentioned one or more compounds represented by formula III are selected from the group consisting of compounds represented by III1-III5:

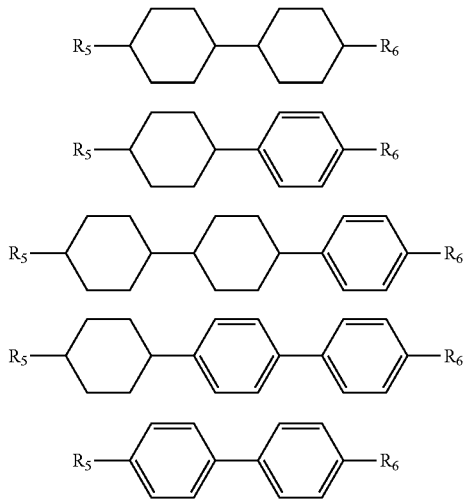

wherein $R_5$ and $R_6$ each independently represent an alkyl group having a carbon atom number of 1-10 or an alkoxy group having a carbon atom number of 1-10, and any one or more $CH_2$ in $R_5$ and $R_6$ are optionally substituted with cyclopentyl, cyclobutyl or cyclopropyl.

The compound represented by formula III has the characteristic of a low rotary viscosity and when used in a liquid crystal composition, can reduce the rotary viscosity of and improve the response speed of the liquid crystal composition.

Optionally, the above-mentioned negative dielectric anisotropic liquid crystal composition further comprises one or more compounds represented by formula IV:

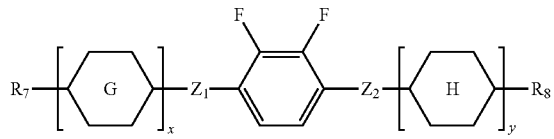

wherein $R_7$ and $R_8$ each independently represent an alkyl group having a carbon atom number of 1-10, a fluoro-substituted alkyl group having a carbon atom number of 1-10, an alkoxy group having a carbon atom number of 1-10, or a fluoro-substituted alkoxy group having a carbon atom number of 1-10, and any one or more $CH_2$ in $R_7$ and $R_8$ are optionally substituted with cyclopentyl, cyclobutyl or cyclopropyl;

$Z_1$ and $Z_2$ each independently represent a single bond, —COO—, —$CH_2O$— or —$CH_2CH_2$—;

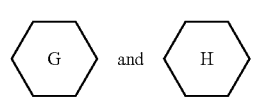

each independently represent

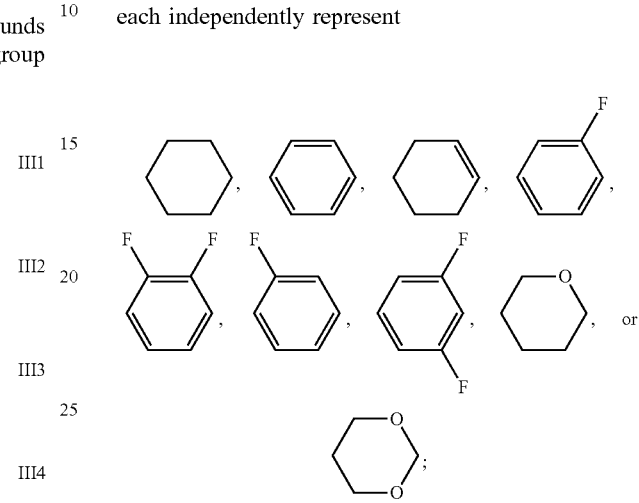

x represents 1, 2 or 3; and y represents 0 or 1.

Optionally, the above-mentioned one or more compounds represented by formula IV are selected from the group consisting of compounds represented by formulas IV1 to IV13:

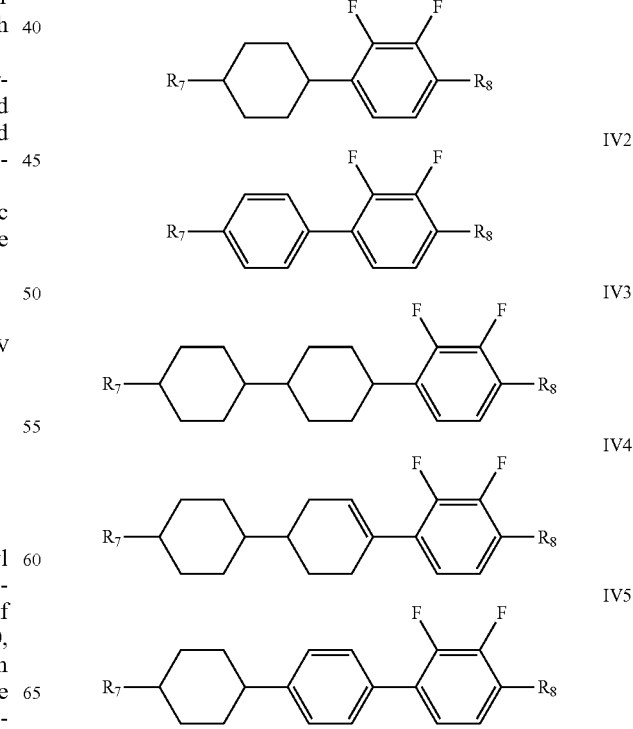

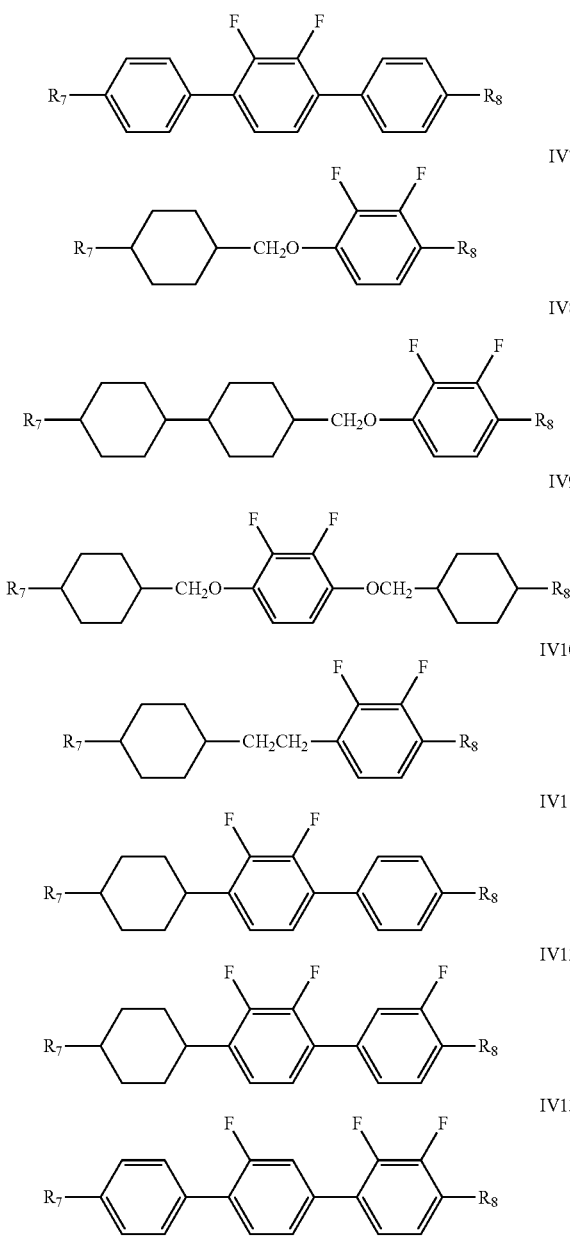

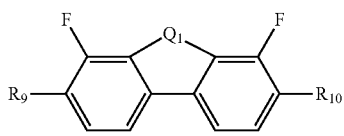

wherein $R_7$ and $R_8$ each independently represent an alkyl group having a carbon atom number of 1-10, a fluoro-substituted alkyl group having a carbon atom number of 1-10, an alkoxy group having a carbon atom number of 1-10, or a fluoro-substituted alkoxy group having a carbon atom number of 1-10, and any one or more $CH_2$ in $R_7$ and $R_8$ are optionally substituted with cyclopentyl, cyclobutyl or cyclopropyl.

The compound represented by formula IV has a larger negative dielectric anisotropy and when used in a liquid crystal composition, can effectively reduce the drive voltage of the liquid crystal composition.

Optionally, the above-mentioned negative dielectric anisotropic liquid crystal composition further comprises one or more compounds represented by formula V.

wherein $R_9$ and $R_{10}$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in $R_9$ and $R_{10}$ are optionally substituted with cyclopentyl, cyclobutyl or cyclopropyl; and $Q_1$ represents —O—, —S—, —$CH_2$O— or —$CH_2$S—.

The compound represented by formula V has a larger negative dielectric anisotropy with respect to formula IV, and the use of the polar compound in a liquid crystal composition in a relatively small amount can afford the same drive voltage, thereby increasing the content of a neutral compound in the liquid crystal composition, and thus lowering the viscosity of the liquid crystal composition.

Optionally, in the above-mentioned negative dielectric anisotropic liquid crystal composition, the content of the compound represented by formula I is 1%-50% by mass, the content of the compound represented by formula II is 0.1%4% by mass, the content of the compound represented by formula III is 10%-50% by mass, the content of the compound represented by formula IV is 1%-60% by mass, and the content of the compound represented by formula V is 1%-50% by mass; and wherein the content of each liquid crystal compound in the liquid crystal composition is calculated based on the total content of the compounds represented by formula I, formula III, formula IV and formula V in the liquid crystal composition as being 100%.

Optionally, in the above-mentioned negative dielectric anisotropic liquid crystal composition, the content of the compound represented by formula I is 1%-50% by mass, the content of the compound represented by formula II is 0.1%-1% by mass, and the content of the compound represented by formula III is 10%-70% by mass, wherein the content of each liquid crystal compound in the liquid crystal composition is calculated based on the total content of the compounds represented by formula I and formula III in the liquid crystal composition as being 100%.

Optionally, in the above-mentioned negative dielectric anisotropic liquid crystal composition, the content of the compound represented by formula I is 1%-50% by mass, the content of the compound represented by formula II is 0.1%-1% by mass, and the content of the compound represented by formula IV is 10%-60% by mass, wherein the content of each liquid crystal compound in the liquid crystal composition is calculated based on the total content of the compounds represented by formula I and formula IV in the liquid crystal composition as being 100%.

Optionally, in the above-mentioned negative dielectric anisotropic liquid crystal composition, the content of the compound represented by formula I is 1%-50% by mass, the content of the compound represented by formula II is 0.1%-1% by mass, and the content of the compound represented by formula V is 10%-60% by mass, wherein the content of each liquid crystal compound in the liquid crystal composition is calculated based on the total content of the compounds represented by formula I and formula V in the liquid crystal composition as being 100%.

Optionally, in the above-mentioned negative dielectric anisotropic liquid crystal composition, the content of the compound represented by formula I is 1%-50% by mass, the content of the compound represented by formula II is 0.1%4% by mass, the content of the compound represented by formula III is 10%-50% by mass, and the content of the compound represented by formula IV is 10%-60% by mass, wherein the content of each liquid crystal compound in the liquid crystal composition is calculated based on the total content of the compounds represented by formula I, formula III and formula IV in the liquid crystal composition as being 100%.

Optionally, in the above-mentioned negative dielectric anisotropic liquid crystal composition, the content of the compound represented by formula I is 1%-50% by mass, the content of the compound represented by formula II is 0.1%4% by mass, the content of the compound represented by formula III is 10%-50% by mass, and the content of the compound represented by formula V is 10%-60% by mass, wherein the content of each liquid crystal compound in the liquid crystal composition is calculated based on the total content of the compounds represented by formula I, formula III and formula V in the liquid crystal composition as being 100%.

In another aspect of the present invention, there is provided a liquid crystal display element or liquid crystal display, comprising the negative dielectric anisotropic liquid crystal composition according to any one of the clauses mentioned above, said display element or display being a PSA-VA, PSA-OCB, PS-IPS, PS-FFS, PS-TN or SA-VA display element or display.

The beneficial effects produced by the above technical solutions lie in that: (1) the negative dielectric anisotropic liquid crystal composition of the present invention results in a reduction in the rotary viscosity of and an increase in the response speed of the negative dielectric anisotropic liquid crystal composition by means of the use of the first component composed of one or more compounds represented by formula I and the second component composed of one or more polymerizable compounds. (2) The liquid crystal display element or liquid crystal display of the present invention has the characteristic of a fast response speed.

DETAILED DESCRIPTION OF EMBODIMENTS

In order to illustrate the present invention more clearly, the present invention will be further described below in conjunction with preferred examples. A person skilled in the art should understand that the following detailed description is illustrative rather than limiting, and should not limit the scope of the invention.

In the present invention, the preparation methods are all conventional methods unless otherwise specified, and the raw materials used are all available from open commercial approaches unless otherwise specified, the percentages all refer to mass percentages, the temperature is in degree Celsius (° C.), a liquid crystal compound is also referred to as a liquid crystal monomer, and the specific meanings of other symbols and the test conditions are as follows:

Cp represents the clearing point (° C.) of a liquid crystal as measured by means of a DSC quantitative method;

S—N represents the melting point (° C.) for the transformation of a liquid crystal from a crystal state to a nematic phase;

$\Delta n$ represents optical anisotropy, with $\Delta n = n_e - n_o$, wherein $n_o$ is the refractive index of an ordinary light, and $n_e$ is the refractive index of an extraordinary light, with the test conditions being: 25±2° C., 589 nm and using an abbe refractometer for testing;

$\Delta\varepsilon$ represents dielectric anisotropy, with $\Delta\varepsilon = \varepsilon// - \varepsilon\perp$, in which $\varepsilon//$ is a dielectric constant parallel to a molecular axis, and $\varepsilon\perp$ is a dielectric constant perpendicular to the molecular axis, with the test conditions being 25±0.5° C., a 20 micron parallel cell, and INSTEC: ALCT-IR1 for testing;

$\gamma 1$ represents rotary viscosity (mPa·s), with the test conditions being 25±0.5° C., a 20 micron parallel cell, and INSTEC: ALCT-IR1 for testing;

$\rho$ represents electrical resistivity ($\Omega\cdot cm$), with the test conditions being: 25±2° C., and the test instruments being a TOYO SR6517 high resistance instrument and an LE-21 liquid electrode; and VHR represents voltage holding ratio (%), with the test conditions being: 20±2° C., a voltage of ±5 V, a pulse width of 10 ms, and a voltage holding time of 16.7 ms. The test equipment is a TOYO Model 6254 liquid crystal performance comprehensive tester;

$\tau$ represents response time (ms), with the test instrument being DMS-501 and the test conditions being: 25±0.5° C., a test cell that is a 3.3 micron IPS test cell, an electrode spacing and an electrode width, both of which are 10 microns, and an included angle between the frictional direction and the electrode of 10°.

Devices and instruments used for preparing liquid crystal media are:

(1) an electronic precision balance (with an accuracy of 0.1 mg)
(2) a stainless steel beaker for liquid crystal weighing
(3) a spoon for adding a monomer
(4) a magnetic rotor for stirring
(5) a temperature-controlled electromagnetic stirrer.

The method for preparing a liquid crystal medium comprises the following steps:

(1) monomers to be used are placed in order and neatly;
(2) a stainless steel beaker is placed on the balance, and the monomers are placed in the stainless steel beaker with a small spoon;
(3) monomer liquid crystals are sequentially added thereto according to weights as required;
(4) the stainless steel beaker to which the materials have been added is placed on the magnetic stirrer, heated and melted; and
(5) after most of the mixture in the stainless steel beaker is melted, a magnetic rotor is added to the stainless steel beaker for uniformly stirring the liquid crystal mixture, and the mixture is cooled to room temperature to obtain the liquid crystal medium.

In the examples of the present invention, liquid crystal monomer structures are represented by codes, and the codes for ring structures, end groups and linking groups of liquid crystals are represented as in Tables 1 and 2 below.

TABLE 1

Corresponding code for ring structure

| Ring structure | Corresponding code |
|---|---|
| 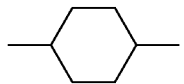 | C |

TABLE 1-continued

Corresponding code for ring structure

| Ring structure | Corresponding code |
|---|---|
| 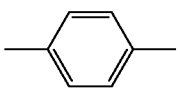 | P |
| 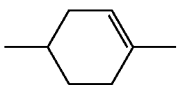 | L |
| 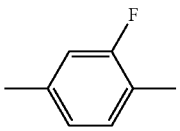 | G |
| 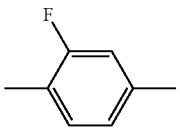 | Gi |
| 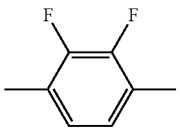 | Y |
| 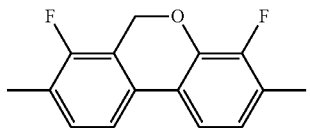 | Sa |
| 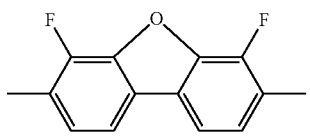 | Sb |
| 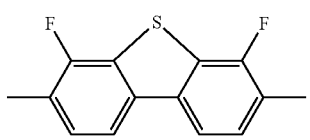 | Sc |
| 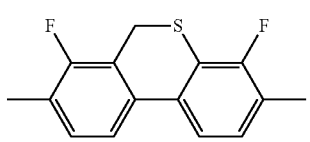 | Sd |

TABLE 2

Corresponding code of end group and linking group

| End group and linking group | Corresponding code |
|---|---|
| $C_nH_{2n+1}-$ | n- |
| $C_nH_{2n+1}O-$ | nO— |
| —OCF$_3$ | —OT |
| —CF$_2$O— | -Q- |
| —CH$_2$O— | —O— |
| —F | —F |
| —CN | —CN |
| —CH$_2$CH$_2$— | -E- |

TABLE 2-continued

Corresponding code of end group and linking group

| End group and linking group | Corresponding code |
|---|---|
| —CH=CH— | —V— |
| —COO— | -Z- |
| —CH=CH—C$_n$H$_{2n+1}$ | Vn— |
| 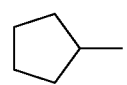 | Cp- |
| 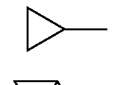 | Cpr- |
|  | Cpr1- |

EXAMPLES

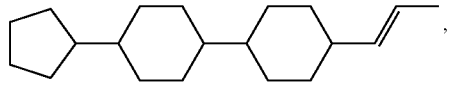

the code of which is CC-Cp-V1; and

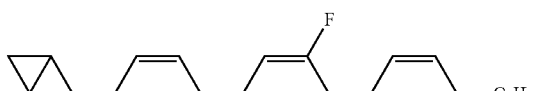

the code is PGP-Cpr1-2.

Example 1

The formulation and corresponding properties of the liquid crystal composition are as shown in table 3 below.

TABLE 3

Formulation and corresponding properties of liquid crystal composition of Example 1

| Category | Liquid crystal monomer code | Content (%) |
|---|---|---|
| I | CPP-3-2V1 | 1 |
| II | II5 | 0.1 |
| II | II6 | 0.2 |
| II | II9 | 0.1 |
| III | CC-3-V | 18 |
| III | CC-2-3 | 8 |
| III | PP-5-1 | 14 |
| III | CCP-2-O1 | 4 |
| III | CPP-3-1 | 6 |
| IV | CCY-3-O4 | 11 |
| IV | CLY-3-O2 | 12 |
| IV | PYP-2-3 | 4 |
| V | Sa-4O-O5 | 5 |
| V | Sb-2O-O4 | 7 |
| V | Sc-2O-O4 | 6 |
| V | Sd-4O-O4 | 6 |
| Performance parameters | S-N: ≤−40° C.<br>Δε [1 KHz, 20° C.]: −4.0<br>Δn [589 nm, 20° C.]: 0.12<br>Cp: 70° C.<br>$\gamma_1$: 78 mPa·s | |

The content of each liquid crystal compound in Example 1 is calculated based on the total content of the compounds represented by formula I, formula III, formula IV and formula V in the liquid crystal composition of Example 1 as being 100%.

Example 2

The formulation and corresponding properties of the liquid crystal composition are as shown in table 4 below.

TABLE 4

Formulation and corresponding properties of liquid crystal composition of Example 2

| Category | Liquid crystal monomer code | Content (%) |
|---|---|---|
| I | CP-1-V | 5 |
| I | CPP-1-2V1 | 4 |
| I | CCP-1-2V2 | 8 |
| I | CPY-2-V1 | 10 |
| I | CYY-3-1V1 | 12 |
| I | CCG-3-V2 | 11 |
| II | II5 | 0.1 |
| II | II8 | 0.2 |
| II | III11 | 0.2 |
| III | CC-2-3 | 22 |
| III | CC-3-V | 9 |
| III | CC-5-3 | 8 |
| III | CCP-3-1 | 11 |
| Performance parameters | S-N: ≤−40° C. $\Delta\epsilon$ [1 KHz, 20° C.]: −1.8 $\Delta n$ [589 nm, 20° C.]: 0.09 Cp: 100° C. $\gamma_1$: 75 mPa·s | |

The content of each liquid crystal compound in Example 2 is calculated based on the total content of the compounds represented by formula I and formula III in the liquid crystal composition of Example 2 as being 100%.

Example 3

The formulation and corresponding properties of the liquid crystal composition are as shown in table 5 below.

TABLE 5

Formulation and corresponding properties of liquid crystal composition of Example 3

| Category | Liquid crystal monomer code | Content (%) |
|---|---|---|
| I | CP-2-1V1 | 11 |
| I | CCP-1-V | 15 |
| I | CPP-3-2V1 | 12 |
| I | CCY-2-2V1 | 2 |
| II | II10 | 0.1 |
| IV | PY-3-O2 | 14 |
| IV | CY-3-O4 | 17 |
| IV | CCY-3-O4 | 4 |
| IV | CLY-3-O2 | 3 |
| IV | CPY-3-O2 | 5 |
| IV | PYP-2-3 | 8 |
| IV | PYP-2-4 | 9 |
| Performance parameters | S-N: ≤−40° C. $\Delta\epsilon$ [1 KHz, 20° C.]: −2.8 $\Delta n$ [589 nm, 20° C.]: 0.14 Cp: 80° C. $\gamma_1$: 90 mPa·s | |

The content of each liquid crystal compound in Example 3 is calculated based on the total content of the compounds represented by formula I and formula IV in the liquid crystal composition of Example 3 as being 100%.

Example 4

The formulation and corresponding properties of the liquid crystal composition are as shown in table 6 below.

TABLE 6

Formulation and corresponding properties of liquid crystal composition of Example 4

| Category | Liquid crystal monomer code | Content (%) |
|---|---|---|
| I | CP-2-1V1 | 8 |
| I | CCP-1-V | 8 |
| I | CCP-5-V2 | 12 |
| I | CPP-3-2V1 | 11 |
| I | CPP-2-2V1 | 11 |
| II | II6 | 0.1 |
| II | II7 | 0.3 |
| V | Sa-2O-O5 | 10 |
| V | Sb-2O-O5 | 10 |
| V | Sa-O-O4 | 10 |
| V | Sc-Cpr1O-O4 | 10 |
| V | Sc-2O-O4 | 10 |
| Performance parameters | S-N: ≤−40° C. $\Delta\epsilon$ [1 KHz, 20° C.]: −5.6 $\Delta n$ [589 nm, 20° C.]: 0.15 Cp: 73° C. $\gamma_1$: 130 mPa·s | |

The content of each liquid crystal compound in Example 4 is calculated based on the total content of the compounds represented by formula I and formula V in the liquid crystal composition of Example 4 as being 100%.

Example 5

The formulation and corresponding properties of the liquid crystal composition are as shown in table 7 below.

TABLE 7

Formulation and corresponding properties of liquid crystal composition of Example 5

| Category | Liquid crystal monomer code | Content (%) |
|---|---|---|
| I | CP-1-1V1 | 10 |
| I | CP-3-V1 | 11 |
| I | CCP-2-1V1 | 7 |
| I | CPP-3-2V1 | 10 |
| I | CPP-5-V1 | 4 |
| I | CPP-3-V1 | 8 |
| II | II5 | 0.4 |
| II | II7 | 0.4 |
| III | CC-2-3 | 10 |
| V | Sa-5O-O2 | 6 |
| V | Sb-5O-O4 | 5 |
| V | Sa-Cp1O-O4 | 6 |
| V | Sc-2O-O4 | 8 |
| V | Sd-4O-O4 | 8 |
| Performance parameters | S-N: ≤−40° C. $\Delta\epsilon$ [1 KHz, 20° C.]: −5.9 $\Delta n$ [589 nm, 20° C.]: 0.14 Cp: 65° C. $\gamma_1$: 86 mPa·s | |

The content of each liquid crystal compound in Example 5 is calculated based on the total content of the compounds represented by formula I, formula III and formula V in the liquid crystal composition of Example 5 as being 100%.

Example 6

The formulation and corresponding properties of the liquid crystal composition are as shown in table 8 below.

TABLE 8

Formulation and corresponding properties of liquid crystal composition of Example 6

| Category | Liquid crystal monomer code | Content (%) |
|---|---|---|
| I | CP-1-1V1 | 8 |
| I | CCP-2-1V1 | 5 |
| I | CCP-3-2V1 | 4 |
| I | CPP-3-2V1 | 11 |
| I | CPP-5-V1 | 8 |
| I | CPP-3-V1 | 7 |
| I | CPY-4-V1 | 7 |
| II | II6 | 0.5 |
| II | II10 | 0.5 |
| IV | CPY-5-O2 | 1 |
| V | Sa-5O -O1 | 8 |
| V | Sb-5O -O2 | 7 |
| V | Sa-Cp1O-O4 | 6 |
| V | Sb-CprO-O4 | 8 |
| V | Sc-2O -O4 | 5 |
| V | Sd-4O -O4 | 4 |
| V | Sc-Cp1O-O4 | 6 |
| V | Sb-4O -O1 | 5 |
| Performance parameters | S-N: ≤−40° C.<br>Δε [1 KHz, 20° C.]: −6.0<br>Δn [589 nm, 20° C.]: 0.16<br>Cp: 80° C.<br>γ$_1$: 120 mPa · s | |

The content of each liquid crystal compound in Example 6 is calculated based on the total content of the compounds represented by formula I, formula IV and formula V in the liquid crystal composition of Example 6 as being 100%.

Example 7

The formulation and corresponding properties of the liquid crystal composition are as shown in table 9 below.

TABLE 9

Formulation and corresponding properties of liquid crystal composition of Example 7

| Category | Liquid crystal monomer code | Content (%) |
|---|---|---|
| I | CP-3-V1 | 6 |
| I | CCP-3-V1 | 9 |
| I | CPP-3-2V1 | 8 |
| I | CY-5-2V | 7 |
| II | II5 | 0.3 |
| III | CC-4-3 | 16 |
| III | CC-2-3 | 3 |
| III | CC-5-3 | 5 |
| III | CCP-V-1 | 6 |
| IV | PY-3-O2 | 3 |
| IV | CY-3-O4 | 3 |
| IV | CCY-3-O4 | 12 |
| IV | CLY-3-O2 | 8 |
| IV | CPY-3-O2 | 11 |
| IV | PYP-2-3 | 3 |
| Performance parameters | S-N: ≤−40° C.<br>Δε [1 KHz, 20° C.]: −2.7<br>Δn [589 nm, 20° C.]: 0.11<br>Cp: 98° C.<br>γ$_1$: 100 mPa · s | |

The content of each liquid crystal compound in Example 7 is calculated based on the total content of the compounds represented by formula I, formula III and formula IV in the liquid crystal composition of Example 7 as being 100%.

Example 8

The formulation and corresponding properties of the liquid crystal composition are as shown in table 10 below.

TABLE 10

Formulation and corresponding properties of liquid crystal composition of Example 8

| Category | Liquid crystal monomer code | Content (%) |
|---|---|---|
| I | CPP-3-V1 | 7 |
| I | CPP-3-2V1 | 8 |
| II | II7 | 0.3 |
| III | CC-2-3 | 21 |
| III | CC-4-3 | 4 |
| III | CC-5-3 | 3 |
| III | PP-5-1 | 12 |
| III | CCP-3-1 | 4 |
| IV | CCY-3-O2 | 12 |
| IV | CCY-2-O2 | 3 |
| IV | CLY-3-O2 | 8 |
| IV | CPY-3-O2 | 10 |
| IV | CPY-2-O2 | 7 |
| V | Sa-5O -O2 | 1 |
| Performance parameters | S-N: ≤−40° C.<br>Δε [1 KHz, 20° C.]: −2.5<br>Δn [589 nm, 20° C.]: 0.13<br>Cp: 113° C.<br>γ$_1$: 98 mPa · s | |

The content of each liquid crystal compound in Example 8 is calculated based on the total content of the compounds represented by formula I, formula III, formula IV and formula V in the liquid crystal composition of Example 8 as being 100%.

Comparative Example 1

The formulation and corresponding properties of the liquid crystal composition are as shown in table 11 below.

TABLE 11

Formulation and corresponding properties of liquid crystal composition of Comparative Example 1

| Category | Liquid crystal monomer code | Content (%) |
|---|---|---|
| Other | CPP-5-2 | 7 |
| Other | CPP-3-2 | 8 |
| II | II7 | 0.3 |
| III | CC-2-3 | 21 |
| III | CC-4-3 | 4 |
| III | CC-5-3 | 3 |
| III | PP-5-1 | 12 |
| III | CCP-3-1 | 4 |
| IV | CCY-3-O2 | 12 |
| IV | CCY-2-O2 | 3 |
| IV | CLY-3-O2 | 8 |
| IV | CPY-3-O2 | 10 |
| IV | CPY-2-O2 | 7 |
| V | Sa-5O -O2 | 1 |
| Performance parameters | S-N: ≤−40° C.<br>Δε [1 KHz, 20° C.]: −2.5<br>Δn [589 nm, 20° C.]: 0.12<br>Cp: 102° C.<br>γ$_1$: 112 mPa · s | |

The content of each liquid crystal compound in Comparative Example 1 is calculated based on the total content of the compounds represented by formula III, formula IV and formula V and other categories in the liquid crystal composition of Comparative Example 1 as being 100%.

As can be seen from the comparison between Example 8 and Comparative Example 1, the liquid crystal composition provided in Example 8 has a larger Δn, a higher clearing point, and a lower rotary viscosity, so that the liquid crystal composition has a faster response speed. The compound represented by formula I has an alkenyl group, and the alkenyl group attached to the phenyl ring is more rigid than an alkyl group attached thereto. When the liquid crystal molecules rotate, segments are entangled with each other, and the alkyl group connected to the benzene ring has a stronger entangling than the case where the benzene ring is connected to an alkenyl, thereby affecting the rotation of the liquid crystal molecules, thereby making the liquid crystal molecules more rotationally viscous. Therefore, the rotary viscosity of the compound in which an alkenyl group is connected to the benzene ring is smaller, which is more advantageous for lowering the rotary viscosity of the liquid crystal composition and improving the response speed. When the liquid crystal composition is applied to a liquid crystal display element or a liquid crystal display, the response speed of the liquid crystal display element or liquid crystal display can be effectively improved.

The invention claimed is:

1. A negative dielectric anisotropic liquid crystal composition, wherein said negative dielectric anisotropic liquid crystal composition comprises a first component composed of one or more compounds represented by formula I2 and a second component composed of one or more polymerizable compounds,

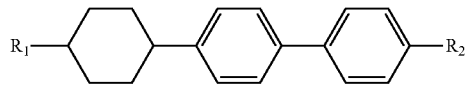

I2 wherein $R_1$ represents an alkyl group having a carbon atom number of 1-10;

$R_2$ represents $—(CH_2)_p—CH=CH—C_qH_{2q+1}$, with p representing 1, 2 or 3, q representing 0, 1, 2 or 3.

2. The negative dielectric anisotropic liquid crystal composition according to claim 1, wherein said polymerizable compound is a compound represented by formula II:

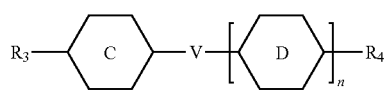

II wherein, $R_3$ and $R_4$ each independently represent W-Sp-, H, Cl, F, or an alkyl group having a carbon atom number of 1-12, with one or two non-neighboring $CH_2$ groups in said alkyl group having a carbon atom number of 1-12 being optionally replaced by —O—, —$CH_2$=$CH_2$—, —CO—, —OCO— or —COO—, wherein at least one of $R_3$ and $R_4$ represents W-Sp-;

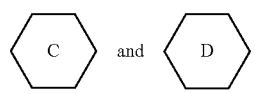

each independently represent a phenylene group, a phenylene group optionally substituted with W-Sp-, Cl, F, an alkyl group having a carbon atom number of 1-12 or an alkoxy group having a carbon atom number of 1-12, or an indanyl group, wherein one or two non-neighboring $CH_2$ groups in said alkyl group having a carbon atom number of 1-12 and said alkoxy group having a carbon atom number of 1-12 are optionally replaced by —O—, —$CH_2$=$CH_2$—, —CO—, —OCO— or —COO—; furthermore,

and $R_3$ are bonded at any position of

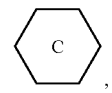

and

and $R_4$ are bonded at any position of

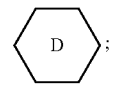

n represents 0, 1 or 2;
W represents a methacrylate group or an acrylate group; and
V and Sp each independently represent a single bond, —COO—, —$CH_2$O— or —$CH_2CH_2$—.

3. The negative dielectric anisotropic liquid crystal composition according to claim 2, wherein:
the compound represented by formula II is selected from the group consisting of compounds represented by formulas II1-II4:

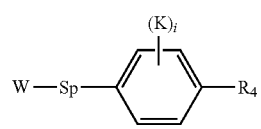

II1

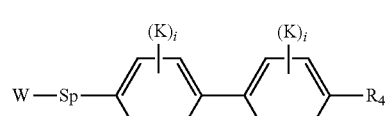

II2

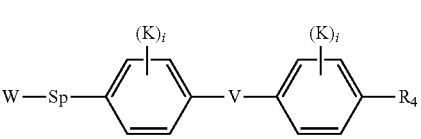

II3

-continued

II4

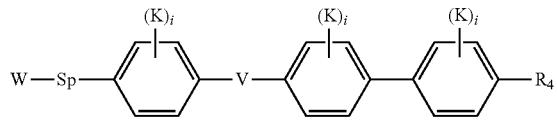

wherein $R_4$ and K each independently represent $W_1$-Sq-, H, Cl, F, or an alkyl group having a carbon atom number of 1-12, wherein one or two non-neighboring $CH_2$ groups in said alkyl group having a carbon atom number of 1-12 is optionally replaced by —O—, —$CH_2$=$CH_2$—, —CO—, —OCO— or —COO—, W and $W_1$ each independently represent a methacrylate group or an acrylate group;

V, Sp, and Sq each independently represent a single bond, —COO—, —$CH_2$O—, or —$CH_2CH_2$—; and each i independently represents 0, 1, 2, 3 or 4.

4. The negative dielectric anisotropic liquid crystal composition according to claim 1, wherein said negative dielectric anisotropic liquid crystal composition further comprises one or more compounds represented by formula III:

III

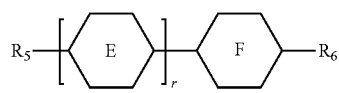

wherein $R_5$ and $R_6$ each independently represent an alkyl group having a carbon atom number of 1-10 or an alkoxy group having a carbon atom number of 1-10, and any one or more $CH_2$ in $R_5$ and $R_6$ are optionally substituted with cyclopentyl, cyclobutyl or cyclopropyl;

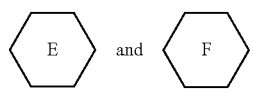

each independently represent

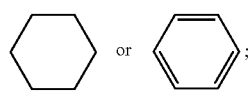

and r represents 1 or 2.

5. The negative dielectric anisotropic liquid crystal composition according to claim 4, wherein said one or more compounds represented by formula III are selected from the group consisting of compounds represented by III1-III5,

III1

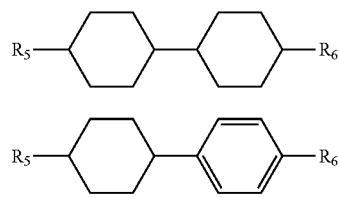

III2

III3

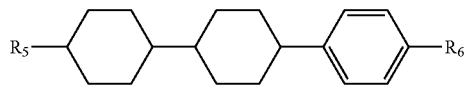

III4

III5

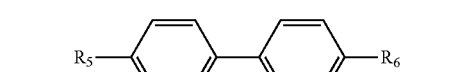
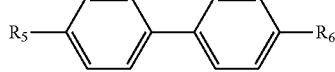

wherein $R_5$ and $R_6$ are each independently an alkyl group having a carbon atom number of 1-10 or an alkoxy group having a carbon atom number of 1-10, and any one or more $CH_2$ in $R_6$ are optionally substituted with cyclopentyl, cyclobutyl or cyclopropyl.

6. The negative dielectric anisotropic liquid crystal composition according to claim 1, wherein said negative dielectric anisotropic liquid crystal composition further comprises one or more compounds represented by formula IV:

(IV)

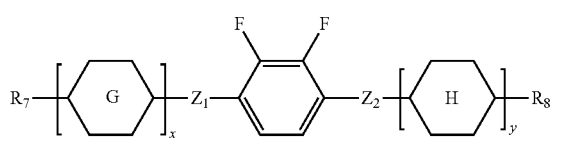

wherein $R_7$ and $R_8$ each independently represent an alkyl group having a carbon atom number of 1-10, a fluoro-substituted alkyl group having a carbon atom number of 1-10, an alkoxy group having a carbon atom number of 1-10, or a fluoro-substituted alkoxy group having a carbon atom number of 1-10, and any one or more $CH_2$ in $R_7$ and $R_8$ are optionally substituted with cyclopentyl, cyclobutyl or cyclopropyl;

$Z_1$ and $Z_2$ each independently represent a single bond, —COO—, —$CH_2$O— or —$CH_2CH_2$—;

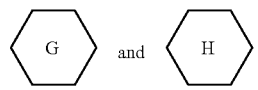

each independently represent

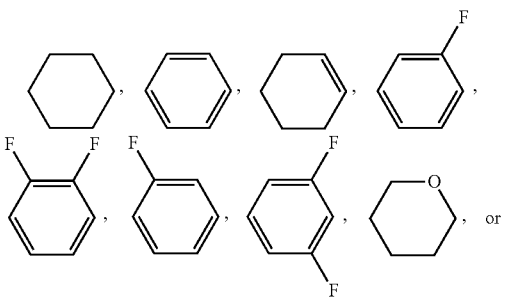

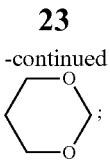

x represents 1, 2 or 3; and y represents 0 or 1.

7. The negative dielectric anisotropic liquid crystal composition according to claim 6, wherein said one or more compounds represented by formula IV are selected from the group consisting of compounds represented by formulas IV1 to IV13:

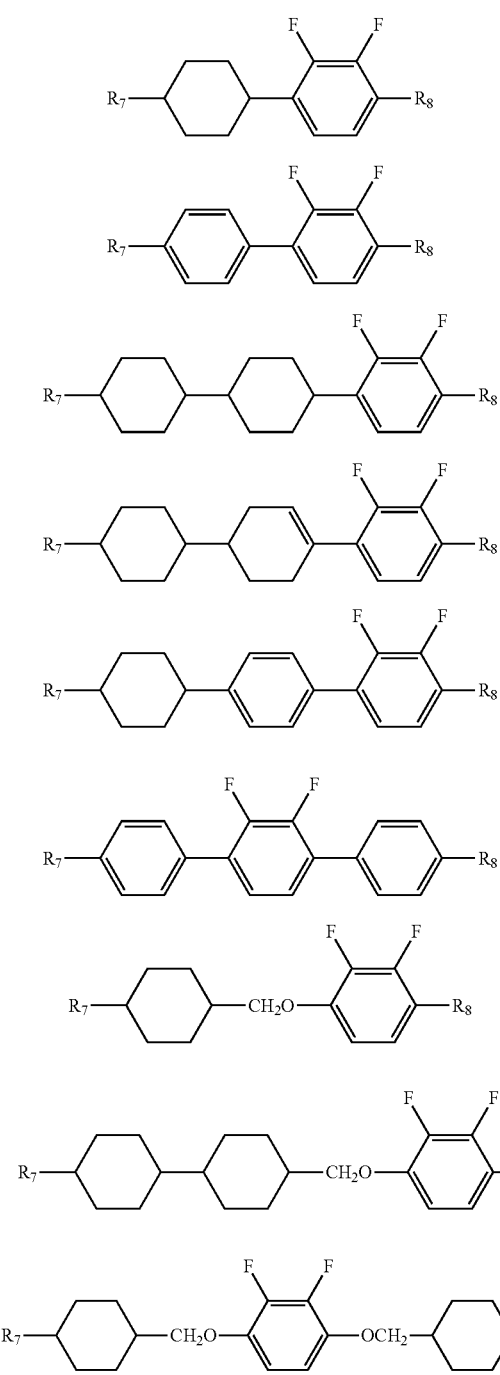

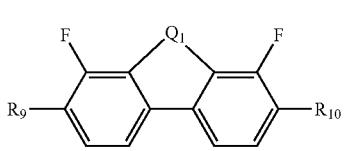

wherein $R_7$ and $R_8$ each independently represent an alkyl group having a carbon atom number of 1-10, a fluoro-substituted alkyl group having a carbon atom number of 1-10, an alkoxy group having a carbon atom number of 1-10, or a fluoro-substituted alkoxy group having a carbon atom number of 1-10, and any one or more $CH_2$ in $R_7$ and $R_8$ are optionally substituted with cyclopentyl, cyclobutyl or cyclopropyl.

8. The negative dielectric anisotropic liquid crystal composition according to claim 1, wherein said negative dielectric anisotropic liquid crystal composition further comprises one or more compounds represented by formula V:

wherein $R_9$ and $R_{10}$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any $CH_2$ in $R_9$ and $R_{10}$ are optionally substituted with cyclopentyl, cyclobutyl or cyclopropyl; and $Q_1$ represents —O—, —S—, —$CH_2$O— or —$CH_2$S—.

9. The negative dielectric anisotropic liquid crystal composition according to claim 1, wherein in said negative dielectric anisotropic liquid crystal composition, the content of said compound represented by formula I2 is 1%-50% by mass.

10. A liquid crystal display element or liquid crystal display, comprising the negative dielectric anisotropic liquid crystal composition according to claim 1, said display element or display being a PSA-VA, PSA-OCB, PS-IPS, PS-FFS, PS-TN or SA-VA display element or display.

11. The negative dielectric anisotropic liquid crystal composition according to claim 2, wherein in said negative dielectric anisotropic liquid crystal composition, the content of said compound represented by formula II is 0.1%-1% by mass.

12. The negative dielectric anisotropic liquid crystal composition according to claim 4, wherein in said negative dielectric anisotropic liquid crystal composition, the content of said compound represented by formula III is 10%-50% by mass.

13. The negative dielectric anisotropic liquid crystal composition according to claim 6, wherein in said negative dielectric anisotropic liquid crystal composition, the content of said compound represented by formula IV is 1%-60% by mass.

14. The negative dielectric anisotropic liquid crystal composition according to claim 8, wherein in said negative dielectric anisotropic liquid crystal composition, the content of said compound represented by formula V is 1%-50% by mass.

\* \* \* \* \*